Aug. 18, 1970 R. E. SMITH 3,524,577
FASTENER INSERTING MEANS

Filed April 3, 1968 5 Sheets-Sheet 1

INVENTOR.
ROY E. SMITH
BY
Channing L. Richards &
Dalbert U. Shefte
ATTORNEYS

Aug. 18, 1970　　　　　R. E. SMITH　　　　3,524,577
FASTENER INSERTING MEANS
Filed April 3, 1968　　　　　　　　　　5 Sheets-Sheet 4

INVENTOR
ROY E. SMITH
BY
Channing L. Richards &
Delbert U. Shuftz
ATTORNEYS

Aug. 18, 1970      R. E. SMITH      3,524,577
FASTENER INSERTING MEANS

Filed April 3, 1968      5 Sheets-Sheet 5

INVENTOR
ROY E. SMITH
BY
Channing L. Richards
Dalbert U. Shefte
ATTORNEYS

United States Patent Office 3,524,577,
Patented Aug. 18, 1970

3,524,577
FASTENER INSERTING MEANS
Roy E. Smith, Atlanta, Ga., assignor to The Auto-Soler Company, Atlanta, Ga., a corporation of Georgia
Filed Apr. 3, 1968, Ser. No. 718,419
Int. Cl. B27c 7/00
U.S. Cl. 227—153                    8 Claims

ABSTRACT OF THE DISCLOSURE

A fluid-actuated fastener inserting means in which a shiftably mounted operating head is caused by fluid pressure to assume and maintain an operative position in clamping relation with work to be secured prior to and during each fluid-actuated fastener insertion by the operating head. As a result, work clamping pressure is readily adjusted to the nature of the work being handled, and, even more importantly, all essential operating mechanism is arranged in relation to the operating head alone, so that exceptional flexibility is allowed in disposing the operating head to the best advantage for the varying needs of particular fastener inserting operations.

BACKGROUND OF THE INVENTION

Fastener inserting means, particularly such means having the capability for cyclically forming each fastener in preparation for insertion, have heretofore incorporated a fixed operating head as a general practice, while providing an opposed and separately actuated work support for presenting the work at the operating head and imposing a sufficient clamping force on the work as each fastener is inserted. Examples are found in U.S. Pat. Nos. 2,793,-364, 3,008,143, 3,023,412 and 3,233,811; all of which disclose specially arranged work supporting means adapted for particular purposes. In each instance it will be seen that the work supporting means incorporates substantial operating mechanism and that provision must be made for relating the actuation of this mechanism with that of the fastener inserting operating head while maintaining adequate throat clearance for manipulating the work to be handled therebetween. The result has been to limit design flexibility materially so as not only to require a special design almost always for each special purpose fastener inserting operation, but also to restrict the special purpose possibilities for employing fastener inserting means of the sort shown by the foregoing patents.

SUMMARY OF THE INVENTION

The fastener inserting means of the present invention combines the work clamping function in the arrangement of the operating head by which the fasteners are inserted, so as to require no more than a passive work support for positioning the work in opposition to the fastener insertion. The resulting flexibility allowed in disposition of the operating head for fastener insertion is such that no formally constituted work support is needed if the work to be secured will stand accessibly on a floor or can be handled on some other collateral supporting surface or structure. The operating head is shiftably mounted for combining the work clamping function, and fluid actuation of the combined work clamping and fastener inserting functions makes it possible to take full advantage of the disposition flexibility allowed, as will be noted further in relation to the representative embodiment described below.

DESCRIPTION OF THE PREFERRED EMBODIMENT

Figure 1:
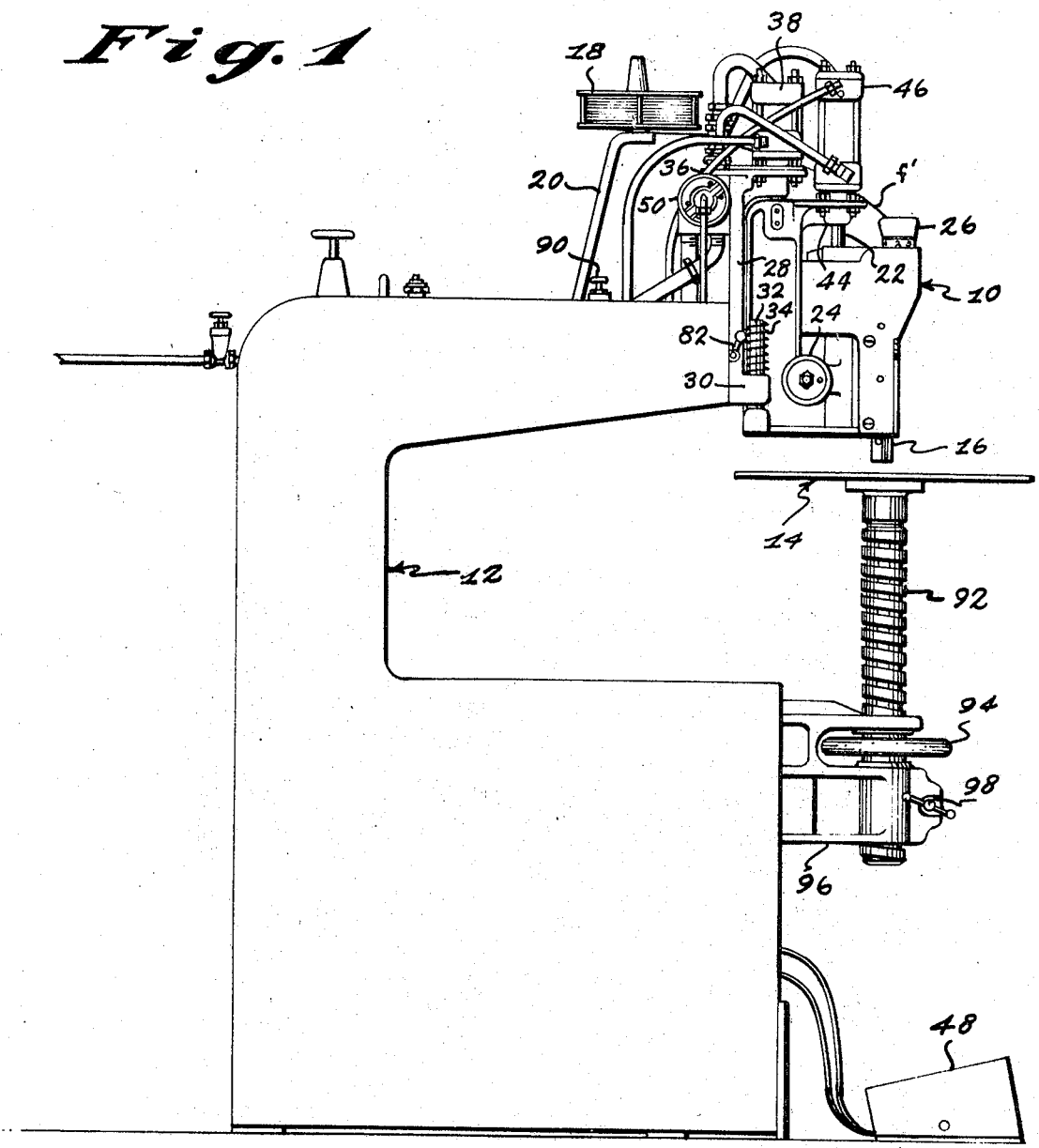
FIG. 1 is a side elevation of a fastener inserting means embodying the present invention.
Figure 2:
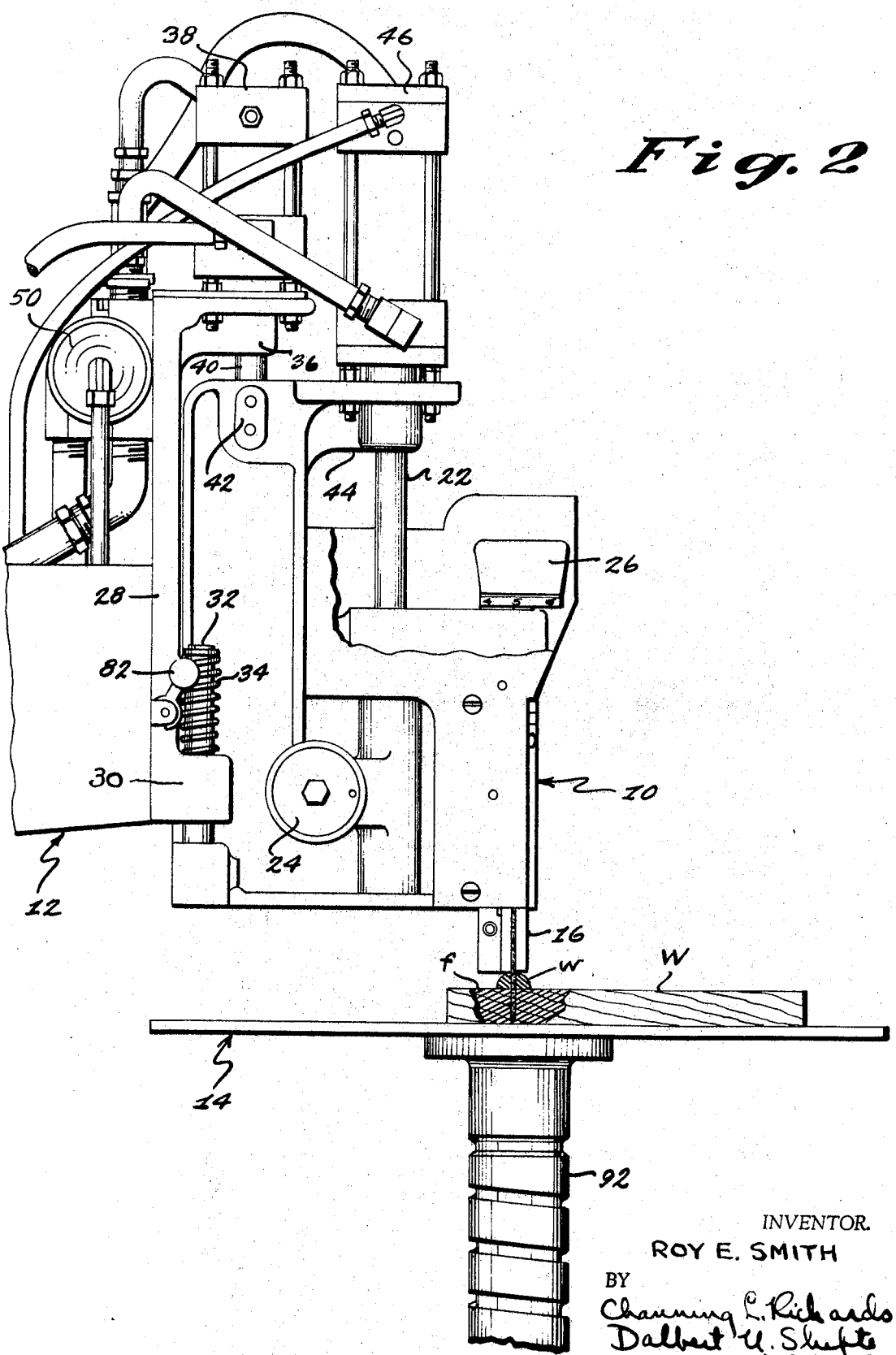
FIG. 2 is a corresponding enlarged detail of the operating head showing the same in operative position and illustrating the insertion of a fastener in representative work disposed on the work support.

The fastener forming means illustrated in the drawings comprises an operating head 10, shiftably mounted on a frame structure 12, for inserting fasteners $f$ in work W, $w$ positioned on an opposing work support 14, which is also carried by the frame structure 12 in the illustrated embodiment (compare FIGS. 1 and 2).

The work being handled as shown in FIG. 2 consists of a wooden panel W to which a molding strip $w$ is secured by the inserted fasteners $f$. For this purpose, the fasteners $f$ are preferably of the blunt end type, so that the operating head 10 suitably incorporates a fastener forming knife assembly at 16 of the sort illustrated and described in U.S. Pat. No. 2,566,104 (under the reference numeral designation 700), although the knife assembly 16 need not be adapted for forming the headed configuration on the fasteners formed as indicated in that prior patent.

A fastener forming knife assembly 16 of the foregoing sort operates to form the fasteners $f$ from a continuous length of wire $f'$ supplied thereto from a dispensing reel 18 disposed adjacently on a bracket arm 20 extending from the frame structure 12. The arrangement of the operating head 10 otherwise, for feeding the wire $f'$ and inserting or driving the fasteners $f$ formed therefrom, corresponds substantially with that disclosed in the above-noted U.S. Pat. No. 2,566,104; a reciprocable operating rod 22 being provided for cyclic actuation of the fastener forming and insertion, and adjustable controls being provided at 24 and 26 for respectively setting the wire feed, to determine fastener length, and providing a suitable driving depth for the fastener inserting plunger.

The shiftable mounting of the operating head 10 is acomplished at a mounting plate 28 fixed vertically on the frame structure 12 and having bosses 30 formed at each lower corner that are bored for slidably receiving operating head guide studs 32. These guide studs 32 are arranged to extend upwardly through the mounting plate bosses 30, and have compression springs 34 retained over their extending ends for bottoming on the bosses 30 and thereby exerting a yieldable bias urging the operating head 10 upwardly.

The mounting plate 28 also has a centrally located boss and bracket portion 36 adjacent its upper edge at which a first fluid-actuated means 38 is secured with an actuating rod 40 extending therefrom slidably through the boss at 36 to a fixed connection at 42 with the operating head 10, so that the latter is slidably located and guided by the studs 32 and actuating rod 40 for shifting between a raised retracted position as seen in FIG. 1 and the lowered operative position indicated in FIG. 2.

A further boss and bracket portion 44 is formed on the operating head 10 to carry a second fluid-actuated means 46 from which the previously mentioned operating rod 22 extends to the operating head 10. The first and second fluid-actuating means 38 and 46 are both controlled from a foot pedal actuator 48 through the control system diagrammed in FIGS. 3 through 7 and by which the operating head is caused to assume and maintain the FIG. 2 operative position in clamping relation with the work W, w prior to and during the insertion of each fastener f.

Figure 3:
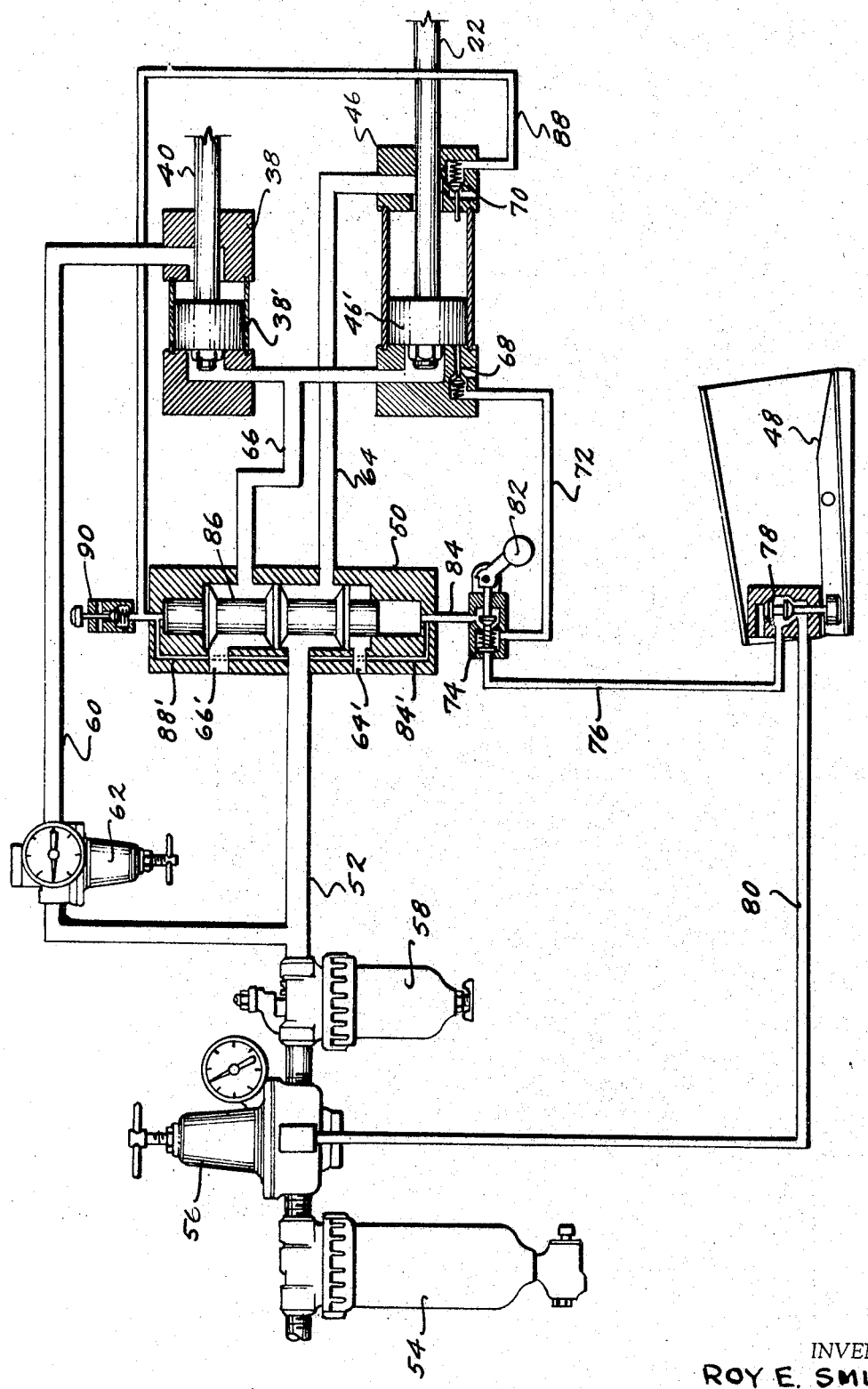
FIG. 3 is a diagrammatic representation of the fluid pressure actuating system and the control means provided therefor.

The control system, as fully diagrammed in FIG. 3, comprises a main control valve 50 to which a fluid pressure supply line 52 runs. The supply line 52 suitably delivers air pressure and is accordingly fitted in conventional fashion with a filter unit 54, a pressure regulator 56, and a lubricator unit 58, before reaching the control valve 50. A branch line 60 runs from the supply line 52 ahead of the control valve 50 through a second regulator 62 that is employed as a throttling means for causing a selected lower pressure to be delivered therethrough. The delivery end of this branch line 60 is connected with the first fluid-actuated means 38 for acting on a piston element 38' thereof to urge the same toward and normally maintain it in a position corresponding to the retracted operating head position; the piston element 38' being connected through the actuating rod 40 for controlling the position of the operating head 10.

Beyond the main control valve 50 a first pressure line 64 runs therefrom to the second fluid-actuated means 46 for acting on a piston element 46' thereof to actuate the recovery portion of a cyclic operation of the operating head 12; the piston element 46' being connected through the operating rod 22 to control the cyclic operation. Normally, this first pressure line 64 is connected to the supply line 52 through the control valve 50 as seen in FIG. 3, for causing the second fluid-actuated means 46 normally to maintain the operating head 10 in a completed cycle condition.

A second pressure line 66 also runs from the control valve 50 to both of the first and second fluid-actuated means 38 and 46 for respectively urging the piston element 38' of the former to shift the operating head 10 toward its FIG. 2 operative position and causing the piston element 46' of the latter to actuate the working portion of a cyclic operation of the operating head 10.

At the second fluid-actuated means 46 first and second bleed valves 68 and 70 are arranged so as alternately to be rendered operative by the piston element 46' at the respective extremes of its movement. The first bleed valve 68 is connected through a control line 72 to a switch valve 74 at which an actuating line 76 is also connected from a valve body 78 at the foot pedal actuator 48. A trap line 80 runs from the supply line regulator 56 to maintain actuating pressure at the valve body 48, while the switch valve 74 is equipped with a disabling lever 82 which provides an on-off switch means for the control system as will be noted further presently.

The control line 72 from the first bleed valve 68 is connectable through the switch valve 74 to a continuing control line segment 84 running to the main control valve 50 endwise of a valve spool 86 shiftably arranged therein for alternatively connecting the supply line 52 therethrough with the first and second pressure lines 64 and 66. A second control line 88 runs from the main control valve 50 in opposite endwise relation to valve spool 86 and connects at the second bleed valve 70, with a manually operable release valve 90 fitted intermediately thereto for a purpose that will also be noted further presently.

The body of the main control valve 50, in addition to having exhaust ports 64' and 66' provided therein in respective relation to the first and second pressure lines 64 and 66, also has equalizing channels 84' and 88' to by-pass balancing pressure from the supply line 52 to the control line segment 84 and the second control line 88 at the opposite ends of the valve spool 86, so that the main control valve 50 is maintained inactive as long as, and whenever, this balancing pressure prevails.

FIG. 3 indicates the normal inactive condition of the control system as a whole, with the first fluid-actuated means 38 pressurized from the branch line 60 to maintain the operating head 10 in retracted position, and with the main control valve 50 set to deliver supply pressure through the first pressure line 64 to the second fluid-actuated means 46 to maintain the operating head 10 in completed cycle condition. The by-passed balancing pressure maintains this setting of control valve 50 because the second control line 88 is closed at the second bleed valve 70, while the oppositely arranged control line segment 84 is closed at the switch valve 74, which is shown disabled by the lever 82. As long as the lever 82 remains in the disabling FIG. 3 position, operation of the control system will be precluded, so that lever 82 functions as an on-off switch in the off position.

Figure 4:
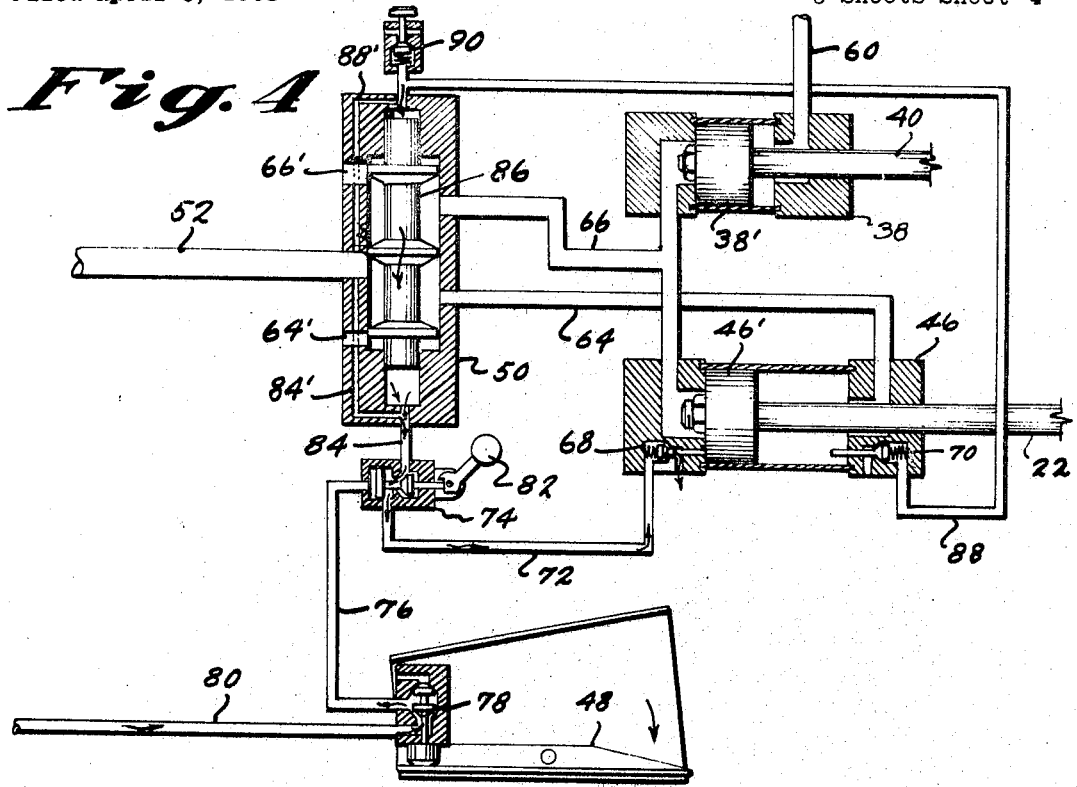
FIGS. 4 through 7 are corresponding diagrammatic representations progressively illustrating the operation of the actuating system by the control means through a complete operating cycle.

Shifting of the lever 82 to its on position produces no change unless the foot pedal actuator 48 is also tripped, because the switch valve 74 is biased to a normally closed position, and shifting of the lever 82 simply enables the switch valve 74 to respond to a foot pedal actuation. FIG. 4 illustrates the nature of such response. Upon depression of the foot pedal actuator 48 the valve body 78 thereat is opened to connect the tap line 80 for pressurizing the actuating line 76 to open the switch valve 74 against the bias thereon. Opening of the switch valve 74 results in releasing the balancing pressure on the control valve spool 86 through the control line segment 84 and the continuing control line 72 to the first bleed valve 68, which is maintained open by the piston element 46' of the second fluid-actuated means 46 at the inactive completed cycle condition of the operating head 10, so that the valve spool 86 is subjected to a downwardly shifting pressure as indicated in FIG. 4.

Figure 5:
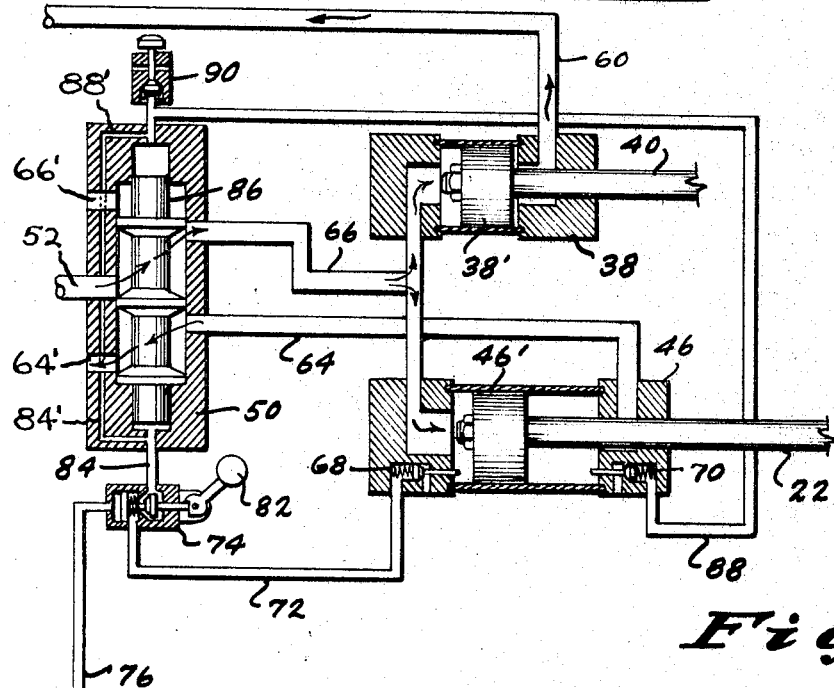

The ultimate result, which is substantially instantaneous, is a shifting of the control valve spool 86 to the FIG. 5 position at which the second pressure line 66 is opened to the supply line 52, and the first pressure line 64 is released through the main valve exhaust port 64'. Pressurizing of the line 66 causes both piston elements 38' and 46' of the first and second fluid-actuated means 38 and 46 to move away from their inactive FIGS. 3 and 4 positions. As the piston element 46' of the second fluid-actuated means 46 moves away it releases the first bleed valve 68 to its closed position so as to re-establish the balancing by-pass pressure at the control valve 50 to hold the valve spool 86 at its downwardly shifted FIG. 5 position, and both piston elements 38' and 46' consequently continue to move away.

The movement of the piston element 38' at this time takes place against the lower opposing pressure maintained thereat through the branch line 60 and against the bias of the compression springs 34 carried by the operating head guide studs 32. Consequently, the force under which such movement of piston element 38' takes place corresponds to the algebraic sum of the actuating pressure applied through the second pressure line 66 and the opposing lower pressure from branch line 60 plus the opposing bias of springs 34. The latter spring bias factor is an unchanging one on balance, but the opposing branch line pressure is made adjustable by the regulator 62 so that the resultant pressure applied to piston element 38' to move it from the retracted position indicated in FIGS. 3 and 4 may be modulated selectively. Accordingly, the regulator 62 makes it possible to set the pressure level under which the operating head 10 is applied and maintained in clamping relation at the work W, w in the manner illustrated by FIG. 2. The capability for such pressure level setting makes it possible in turn to suit the clamping pressure application readily to the needs of the work being handled, so that heavier or lighter clamping may be selected depending upon whether the more important need is for pressure conformation of the work or for the avoidance of clamping scars thereat.

Although application of actuating pressure through the second pressure line 66 causes the piston elements 38' and 46' of both fluid-actuated means 38 and 46 to move away from their inactive FIGS. 3 and 4 positions, the piston element 38' completes its movement first both because its possible operating stroke is shorter and because its movement is not externally resisted until clamping relation with the work W, w is established. Accordingly, the piston element 38' will complete its working stroke at once and will actually stop at some position short of its full stroke extent, such as is indicated in FIG. 5, upon establishing clamping contact with the work. The work support 14, as seen in FIG. 1, is fitted with a screw shank 92 extending through a threaded bore of an adjusting handwheel 94 arranged for rotation in an aligning bracket 96 by which the work support 14 is carried on the frame structure 12, and at which its elevation may be adjusted to present the work W, w for clamping engagement, as seen in FIG. 2, within the working range of piston element 38'. At any adjusted elevation, the work support 14 is held in position by a clamping screw 98 fitted to the aligning bracket 96 for optionally causing the latter to bind the screw shank 92 against movement.

Figure 6:
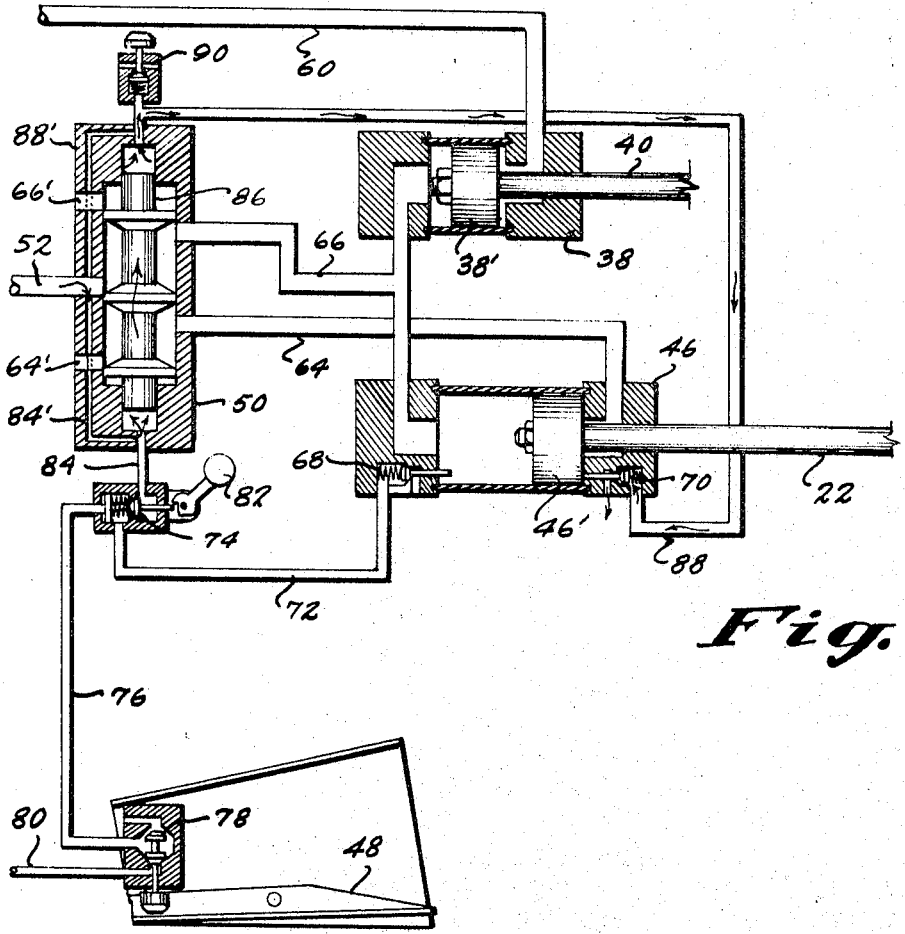

By reason of the foregoing arrangement, the operating head 10 is caused by the first fluid-actuated means 38 to move into clamping contact with the work W, w prior to, as indicated in FIG. 5, and to maintain such clamping contact during, the continued working stroke of the second fluid-actuated means 46, as indicated in FIG. 6, by which the operating head 10 is caused to form and insert a fastener f. Completion of the working stroke of the second fluid-actuated means 46 brings the piston element 46' thereof to its FIG. 6 position at which it renders operative the second bleed valve 70 to open the second control line 88 and release the balancing pressure on the control valve spool 86 and subject the same to an upwardly shifting pressure as indicated in FIG. 6. The result, which is again substantially instantaneous, is a shifting of the control valve spool 86 to the FIG. 7 position at which the second pressure line 66 is released through the main valve exhaust port 66', and the supply pressure is again established through the first pressure line 64 to return the piston element 46' of the second fluid-actuated means 46 through its recovery stroke to the completed cycle position indicated in FIG. 7, in correspondence with FIG. 3; while the piston element 38' of the first fluid-actuated means 38 is allowed to return under the now unopposed pressure maintained in the branch line 60, with the assisting bias of the compression springs 34.

Figure 7:
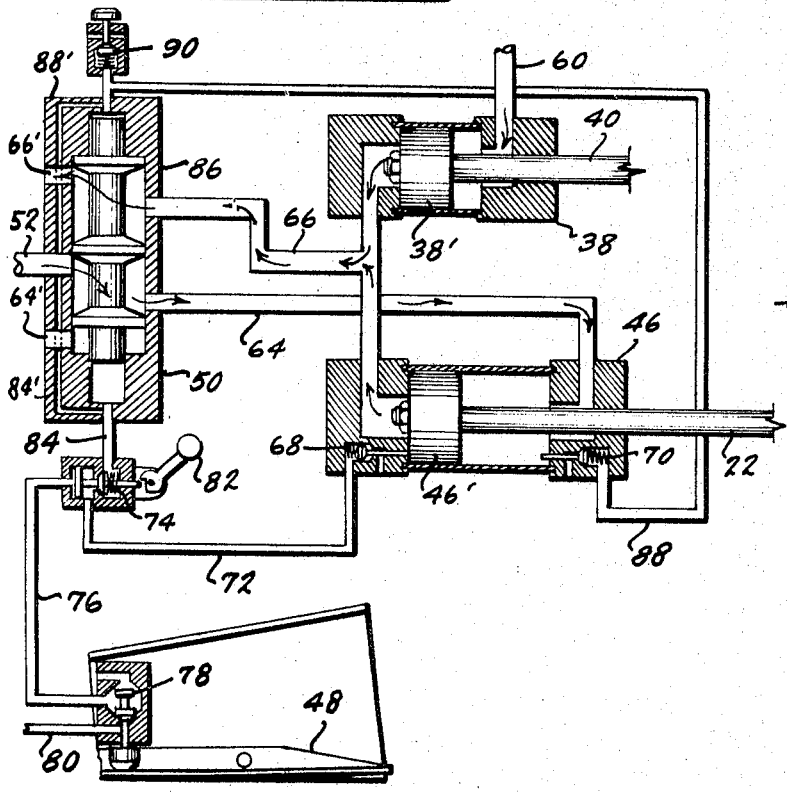

As soon as the piston element 46' of the second fluid-actuated means 46 moves off on its recovery stroke it releases the second bleed valve 70 to its closed position, so that the balancing by-pass pressure is again established at the control valve 50 to hold the valve spool 86 at its upwardly shifted FIG. 7 position, and thereby cause both piston elements 38' and 46' to return to and be held at their completed cycle condition in preparation for the commencement of a succeeding operating cycle whenever triggered by tripping of the foot pedal actuator 48. If the operating head 10 should jam or stall for any reason during the working portion of its operating cycle, so that the piston element 46' of the second fluid-actuated means 46 is prevented from traveling far enough to release the second bleed valve 70, an equivalent effect can be produced by manually operating the auxiliary release valve 90, which is arranged in the second control line 88 for overriding use in such an event.

Succeeding operating cycles may be actuated continuously or intermittently by the simple choice between holding the foot pedal actuator 48 depressed or releasing it after momentary depression for triggering the control system. Either sort of actuation is possible because at the FIG. 7 completed cycle condition the main control valve 50 is always armed for commencing a new operating cycle by the opening of the first bleed valve 68 upon recovery of the piston element 46', and a new operating cycle is therefore always triggered by a depressed foot pedal actuator 48, and is always controlled by closing of the first bleed valve 68 as the piston element 46' moves off upon commencement of an operating cycle, whether the foot pedal actuator 48 is held depressed or not.

The present invention has been described in detail above for purposes of illustration only and is not intended to be limited by this description or otherwise except as defined in the appended claims.

I claim:

1. Fastener inserting means comprising an operating head for inserting fasteners cyclically in work to be secured, means mounting said operating head for shifting between retracted and operative positions with respect to said work, a first fluid-actuated means for causing said operating head to shift between said retracted and operative positions, a second fluid-actuated means for causing cyclic fastener inserting operation of said operating head, and means for controlling said first and second fluid-actuated means sequentially so that said operating head is caused to assume and maintain said operative position in clamping relation at said prior to and during the insertion of each fastener by said operating head.

2. Fastener inserting means as defined in claim 1 and further characterized in that said first fluid-actuated means includes respective oppositely acting fluid pressure supply means for alternately causing said operating head shifting between said positions, in that said control means is selectively operable for applying the supply means acting to cause operating head shifting from said retracted to said operative position, and in that the other opposing supply means includes adjustable throttling means for maintaining a selected lower pressure constantly applied therethrough to modulate the resultant pressure under which said operating head is applied and maintained in clamping relation at said work.

3. Fastener inserting means as defined in claim 1 and further characterized in that said operating head is yieldably biased at said mounting means toward said retracted position.

4. Fastener inserting means as defined in claim 1 and further characterized in that the mounting means for said operating head is included in a frame structure, and in that a work support is carried on said frame structure for supporting work to be secured in position for insertion of fasteners therein by said operating head while the work is clamped on said support by said head.

5. Fastener inserting means as defined in claim 1 and further characterized in that said operating head includes means for cyclically forming the fasteners inserted thereby from a continuous length of wire supplied thereto, and in that means is provided for disposing a supply of wire adjacent said operating head and for progressively releasing the wire from said supply to said head for said fastener formation.

6. Fastener forming means as defined in claim 1 and further characterized in that said control means comprises a main control valve, a fluid pressure supply line running to said main valve, a branch line running from said supply line ahead of said main valve and including throttling means for delivering a lower fluid pressure therethrough, the delivery end of said branch line being connected to said first fluid-actuated means for urging the same toward and normally maintaining it in said retracted operating head position, a first pressure line running from said main valve to said second fluid-actuated means for causing the same to actuate the recovery portion of a cyclic operation of said operating head, said first pressure line being normally connected to said supply line through said main valve for causing the second fluid-actuated means no-mally to maintain said operating head in a completed cycle condition, a second pressure line running from said main valve to both of said first and second fluid-actuated means for respectively urging the former toward said operative operating head position and causing the latter to actuate the working portion of a cyclic operation of said operating head, a first bleed valve rendered operative by said second fluid-actuated means when said operating head is in completed cycle condition to arm said main valve for potential closing of said first pressure line and opening of the second one to said supply line, selectively operable valve means connected in series with said first bleed valve for triggering said armed main valve, and a second bleed valve rendered operative by said second fluid-actuated means when said operating head completes the working portion of a cyclic operation for causing said main valve to close said second pressure line and open the first one to said supply line.

7. Fastener forming means as defined in claim 6 and further characterized in that means is disposed at said selectively operable valve means for optionally disabling the same manually and thereby providing on-off switch means for said control means.

8. Fastener forming means as defined in claim 6 and further characterized in that an optionally operable release valve is connected in series with said second bleed valve for anticipating the function of the latter whenever necessary.

References Cited

UNITED STATES PATENTS

| | | | |
|---|---|---|---|
| 2,881,439 | 4/1959 | Dell | 227—153 |
| 3,023,412 | 3/1962 | Watkins | 227—152 X |
| 3,167,781 | 2/1965 | Rogers | 227—153 |
| 3,238,546 | 3/1966 | Dziki et al. | 227—153 X |

GRANVILLE Y. CUSTER, Jr., Primary Examiner

PO-1050
(5/69)

UNITED STATES PATENT OFFICE
CERTIFICATE OF CORRECTION

Patent No. 3,524,577     Dated Aug. 18, 1970

Inventor(s) Roy E. Smith

It is certified that error appears in the above-identified patent and that said Letters Patent are hereby corrected as shown below:

Column 6, line 18, after "said" insert -- work --; line 67, "no-mally" should be -- normally --.

SIGNED AND SEALED
DEC 8 - 1970

(SEAL)
Attest:

Edward M. Fletcher, Jr.
Attesting Officer

WILLIAM E. SCHUYLER, JR.
Commissioner of Patents